United States Patent
Gemulla et al.

(10) Patent No.: US 7,536,403 B2
(45) Date of Patent: May 19, 2009

(54) METHOD FOR MAINTAINING A SAMPLE SYNOPSIS UNDER ARBITRARY INSERTIONS AND DELETIONS

(75) Inventors: Rainer Gemulla, Dresden (DE); Peter J. Haas, San Jose, CA (US); Wolfgang Lehner, Dresden (DE)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 11/615,481

(22) Filed: Dec. 22, 2006

(65) Prior Publication Data

US 2008/0154541 A1   Jun. 26, 2008

(51) Int. Cl.
   *G06F 17/30* (2006.01)
(52) U.S. Cl. ...................... 707/101; 707/200
(58) Field of Classification Search ................. 707/200, 707/206, 100, 101
   See application file for complete search history.

(56) References Cited

U.S. PATENT DOCUMENTS

| 6,317,752 B1* | 11/2001 | Lee et al. ............... 707/104.1 |
| 6,532,458 B1 | 3/2003 | Chaudhuri et al. |
| 6,542,886 B1 | 4/2003 | Chaudhuri et al. |
| 7,373,359 B2* | 5/2008 | Hill et al. ............... 707/102 |
| 2004/0249810 A1 | 12/2004 | Das et al. |
| 2005/0223019 A1 | 10/2005 | Das et al. |

OTHER PUBLICATIONS

P.G. Gibbons and Y. Matias, "New Sampling-Based Summary Statistics for Improving Approximate Query Answers", ACM SIGMOD, 1998, pp. 331-342.*
P. B. Gibbons and Y. Matias, New sampling-based summary statistics for improving approximate query answers. In Proc. ACM SIGMOD, 1998, pp. 331-342, ACM, Seattle, WA, USA.

* cited by examiner

*Primary Examiner*—Cheryl Lewis
(74) *Attorney, Agent, or Firm*—Shimokaji & Associates

(57) ABSTRACT

A method of incrementally maintaining a stable, bounded, uniform random sample S from a dataset R, in the presence of arbitrary insertions and deletions to the dataset R, and without accesses to the dataset R, comprises a random pairing method in which deletions are uncompensated until compensated by a subsequent insertion (randomly paired to the deletion) by including the insertion's item into S if and only if the uncompensated deletion's item was removed from S (i.e., was in S so that it could be removed). A method for resizing a sample to a new uniform sample of increased size while maintaining a bound on the sample size and balancing cost between dataset accesses and transactions to the dataset is also disclosed. A method for maintaining uniform, bounded samples for a dataset in the presence of growth in size of the dataset is additionally disclosed.

1 Claim, 6 Drawing Sheets

METHOD FOR MAINTAINING A SAMPLE SYNOPSIS UNDER ARBITRARY INSERTIONS AND DELETIONS

BACKGROUND OF THE INVENTION

The present invention relates generally to the field of providing synopses for databases and, more specifically, to maintaining a uniform random sample of the items in a dataset in the presence of an arbitrary sequence of insertions and deletions.

One means for providing a synopsis of a database is to maintain a random sample of the data. Such samples may be used to speed up processing of analytic queries and data-mining tasks, enhance query optimization, and facilitate information integration.

Uniform random sampling, in which all samples of the same size are equally likely, is a fundamental database sampling scheme. Uniform sampling is typically used in applications because most statistical estimators—as well as the formulas for confidence bounds for these estimators—assume an underlying uniform sample. Thus, sample uniformity is desirable if it is not known in advance how the sample will be used. Uniform sampling may also be used as a building block for more complex sampling schemes, such as stratified sampling. Methods for producing uniform samples are, therefore, important to modern database systems.

To provide a database synopsis, a uniform sample may be computed from a dataset that is stored on disk, such as a table in a relational database management system (RDBMS) or a repository of XML documents. Such a sample may be computed as it is needed (i.e., on the fly) or, alternatively, an initial sample may be incrementally maintained by updating the sample as the dataset changes. Incremental maintenance of a synopsis can have significant cost advantages—in that each access of the database may incur, for example, time or processing costs—for example, by amortizing the costs of maintenance of the sample over multiple uses of the sample. Challenges in sample maintenance are (1) to enforce statistical uniformity in the presence of arbitrary insertions and deletions to the dataset, (2) to avoid accesses to the base data (the dataset) to the extent possible, because such accesses are typically expensive, and (3) to keep the sample size as stable as possible, avoiding oversized or undersized samples compared to the size of the dataset.

Datasets may be distinguished as either "stable" datasets whose size (but not necessarily composition) remains roughly constant over time or "growing" datasets in which insertions occur more frequently than deletions over the long run. The former type of dataset generally is typical of transactional database systems and databases of moving objects; the latter type of dataset generally is typical of data warehouses in which historical data accumulates.

For stable datasets, it is highly desirable from a systems point of view to ensure that the sample size stays below a specified upper bound, so that memory for the sample can be allocated initially, with no unexpected memory overruns occurring later on. Moreover, once memory has been allocated for the sample, the sample size should be kept as close to the upper bound as possible in order to maximize the statistical precision of applications that use the sample. In other words, it is desirable to use the allotted space efficiently.

For growing data sets, maintaining a bounded sample (i.e., the sample size stays below an upper bound) generally is of limited practical interest. Over time, such a sample represents an increasingly small fraction of the dataset as the dataset grows. Although a diminishing sampling fraction may not be a problem for tasks such as estimating a population sum, many other tasks—such as estimating the number of distinct values of a specified population attribute—require the sampling fraction to be bounded from below. The goal for a growing data set is therefore to grow the sample in a stable and efficient manner, while also guaranteeing an upper bound on the sample size at all times and using the allotted space efficiently.

A well-known method for incrementally maintaining a sample in the presence of a stream of insertions to the dataset is the classical "reservoir sampling" algorithm, which maintains a simple random sample of a specified size M. Reservoir sampling is a uniform scheme that maintains a random sample of fixed size M, given a sequence of insertions. The reservoir sampling procedure initially includes the first M items into the sample. For each successive insertion into the dataset, reservoir sampling includes the inserted item into the sample with probability $M/|R|$, where $|R|$ is the size of the dataset R just after the insertion; an included item replaces a randomly selected item in the sample.

It is known in the art to reduce the computational costs of reservoir sampling by devising a method to directly generate the (random) number of arriving items to skip between consecutive sample inclusions, thereby avoiding the need to "flip a coin" (e.g., generate an include/exclude decision using a pseudo-random number generator) for each item. One deficiency of the reservoir sampling method is that it cannot handle deletions, and the most obvious modifications for handling deletions either yield procedures for which the sample size systematically shrinks to zero over time or which require expensive base-data accesses, i.e., accesses to the dataset R. Another deficiency is that streams of insertions (and no deletions) to the dataset—for which reservoir sampling is designed—result in growing datasets as discussed above; so that the usefulness of the bounded reservoir sample tends to diminish over time.

Another well-known method for incrementally maintaining a sample in the presence of a stream of insertions to the dataset is the Bernoulli sampling scheme with sampling rate q, denoted BERN(q). Using BERN(q), each inserted item is included in the sample with probability q and excluded with probability 1−q, independent of the other items. For a dataset R, the sample size $|S|$ follows the binomial distribution BINOM($|R|$, q), so that the probability that the size of the sample S is k for k=0, 1, ..., $|R|$ may be calculated as $$P\{|S|=k\}=\text{Binomial coefficient}(|R|;k)\ q^k(1-q)^{|R|-k}.$$

Although the sample size k is random, samples having the same size are equally likely, so that the BERN(q) scheme is indeed uniform as described above. Bernoulli sampling may exhibit uncontrollable variability of the sample size. Indeed, the sample can be as large as $|R|$, so there is no effective upper bound on sample size.

SUMMARY OF THE INVENTION

In one embodiment of the present invention, a computer-implemented method of incrementally maintaining a stable, bounded, uniform random sample S from a dataset R, in the presence of arbitrary insertions and deletions to the dataset R, and without accesses to the dataset R, comprises the steps of: determining whether or not there is an uncompensated deletion among the deletions to the dataset R; and in response to an insertion of a first item into the dataset R, and in the case that there is at least one uncompensated deletion of a second item from the dataset R; compensating, in S, the uncompensated deletion by the insertion by including the first item into S if and only if the second item was in S.

In another embodiment of the present invention, a database system—including a dataset R having size |R| and a sample S from the dataset R, the sample S bounded by M—executes steps for: a) creating an initial Bernoulli sample, in which: an item of the initial Bernoulli sample is sampled from one of S or R\S; and the initial Bernoulli sample is bounded by M', with M<M'<|R|; and b) increasing the size of the initial Bernoulli sample to a resized sample by sampling from a stream of transactions on R using Bernoulli sampling, in which the resized sample is bounded by M'.

In still another embodiment of the present invention, a computer program product comprises a computer useable medium including a computer readable program, wherein the computer readable program when executed on a computer causes the computer to: maintain a bounded sample S from a dataset R, where the bounded sample is bounded by a predetermined integer M; determine a new bound M' in response to growth of the dataset R; increase the sample S to a resized sample S in which the resized sample S is bounded by a new bound M'; and continue maintaining the bounded resized sample S from the dataset R, where the bounded resized sample S is bounded by M'.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, embodiments of the present invention provide maintenance of database synopses using dataset sampling that maintains uniformity in the presence of arbitrary insertions and deletions, for both "stable" types of datasets and "growing" types of datasets. Embodiments may be used in conjunction with commercial databases, for example, for quick approximate query answering, statistics estimation, data stream processing, data mining, and data integration.

By maintaining sample uniformity in the presence of arbitrary insertions and deletions to the dataset, embodiments of the present invention differ, for example, from prior art sampling methods that do not maintain uniformity of the data sample in the face of dataset deletions.

In addition, some embodiments of the present invention provide resizing of a sample that increases the sample size (i.e., guarantees a lower bound) while guaranteeing an upper bound on the sample size at all times in contrast to prior art methods, for example, using Bernoulli sampling, that can guarantee neither a lower bound nor an upper bound on the sample. The resizing method of an embodiment of the present invention may perform such a sample resizing while minimizing cost in terms of the number of accesses performed to the base dataset R by making use of insertion and deletion transactions to the base dataset R, in contrast to non-cost effective resizing methods that, for example, may ignore the transactions to the base dataset R altogether by discarding the current sample and creating an entirely new sample from accesses to the base dataset R.

Figure 1:
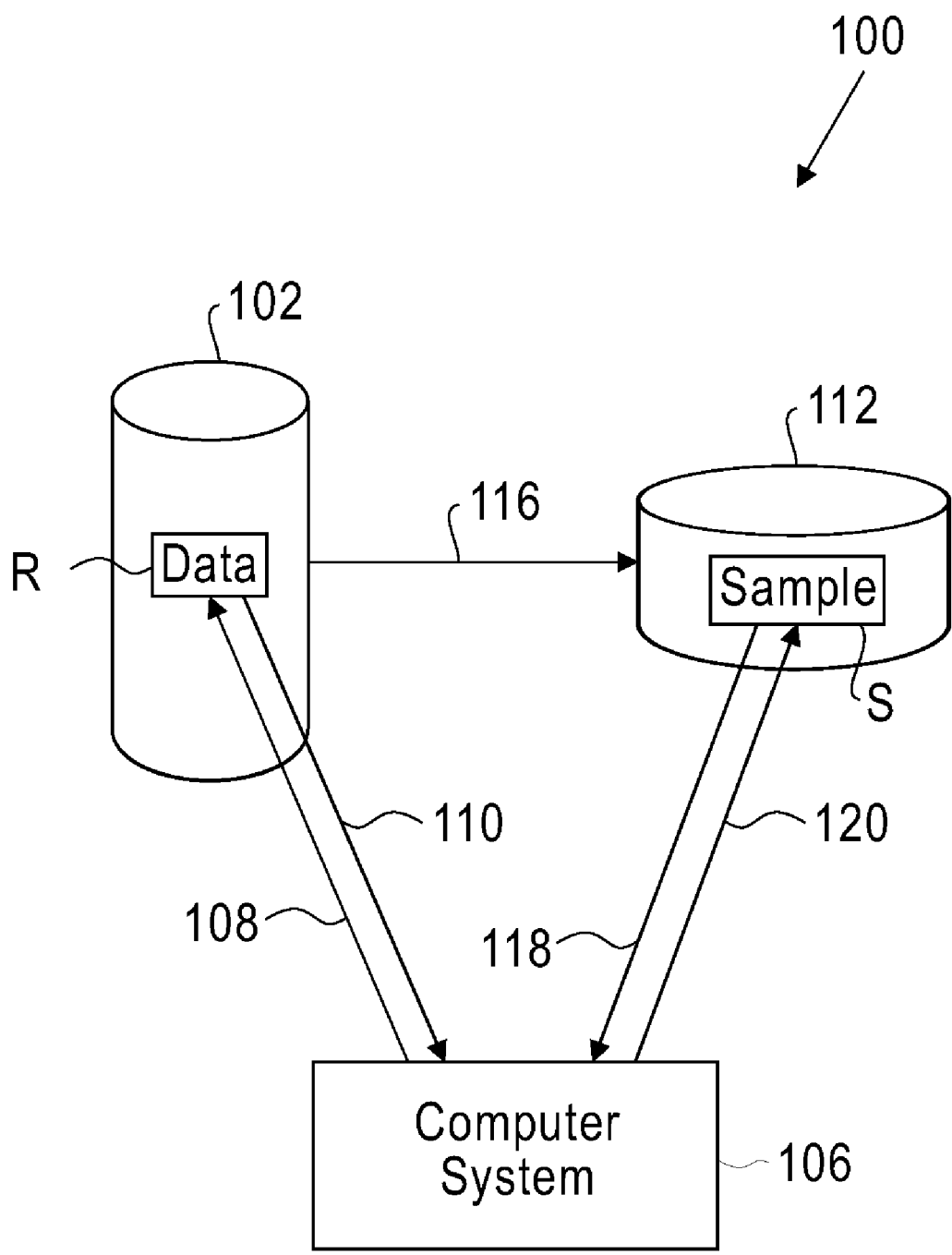
FIG. 1 is a system block diagram illustrating a system for providing database synopses in accordance with an embodiment of the present invention.

FIG. 1 illustrates database system 100 in accordance with one embodiment of the present invention. System 100 may include a data storage device 102, which may comprise a disk drive or other computer readable data storage device, which may, for example, be accessed over a network. Data storage device 102 may include a dataset R that may be readable from data storage device 102 by a computer system 106. Computer system 106 may include devices for receiving inputs, for example, from human users or from other systems and devices (not shown). Computer system 106 may also include devices for displaying information to human users, for example, or for providing electronic outputs to other systems and devices. In particular, computer system 106 may provide a stream of insertion and deletion transactions 108 to the dataset R. Also, computer system 106 may receive information from computer system 106 via data accesses 110 of the dataset R.

System 100 may include a second data storage device 112, which may comprise a disk drive, in-memory cache, or other computer readable data storage device. Alternatively, for example, second data storage device 112 may be implemented as part of data storage device 102. Data storage device 112 may include a sample S. Sample S may comprise data entities that are acquired as samples 116 from the data entities of dataset R so that sample S may be a subset of dataset R. Computer system 106 may receive information in the form of data accesses 118 (e.g., "data reads") from sample S and may provide updates 120 (e.g., "data writes" or modifications) to sample S. For example, computer system 106 may use a random pairing method in accordance with one embodiment to modify the sample S. Computer system 106 might then be used, for example, to perform a query optimization, using sample S, with respect to dataset R without incurring any data accesses 110.

Figure 2:
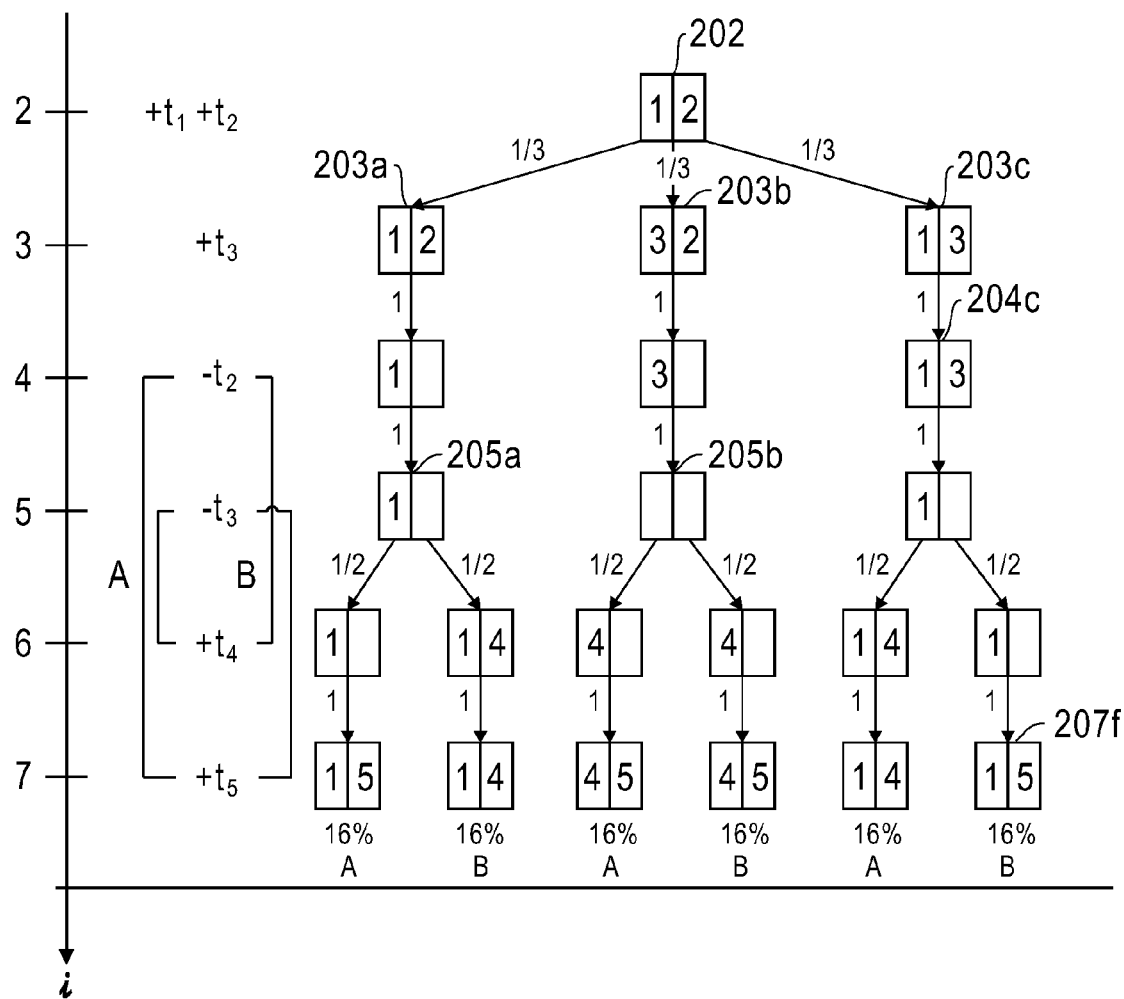
FIG. 2 is an operational dataflow diagram illustrating operation of random pairing for database sampling in accordance with an embodiment of the present invention.
Figure 3:
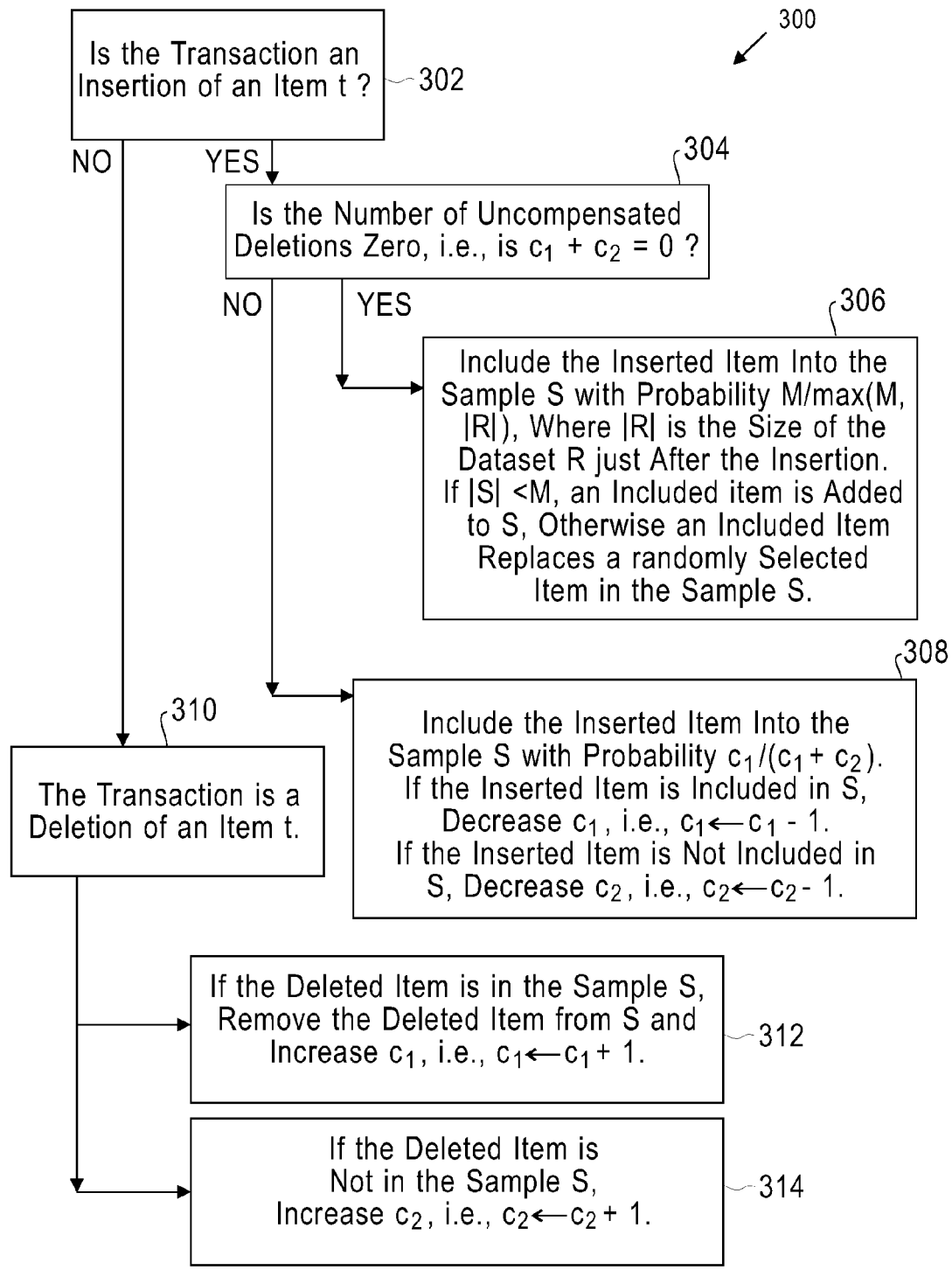
FIG. 3 is a flowchart illustrating a method of random pairing database sampling in accordance with an embodiment of the present invention.

Referring now to FIG. 2 and FIG. 3, FIG. 2 illustrates a process in which a random pairing method 300 (see FIG. 3), according to one embodiment of the present invention, is applied to a dataset R for incrementally maintaining a sample S. In the simplified example illustrated by FIG. 2, the size of the sample S is |S|=2, the pre-determined upper bound on sample size is M=2, and the size of the dataset R is |R|=2. FIG. 2 shows all possible states (for each given transaction $t_i$) of the sample S along with the probabilities of the state transitions.

The example begins at time i=2, at which two insertion transactions 108 represented by "$+t_1$" and "$+t_2$" may have been made to an initially empty dataset R. (In this simplified example, the sample S coincides with R.) The result on sample S of the insertions $+t_1$ and $+t_2$ may be represented by the numerals "1" and "2" at state 202, which represents the only possible result of the two insertions on sample S and, therefore, state 202 has a 100% probability. Thus, in this example, state 202 is the only state represented at time i=2 in FIG. 2. While numerals "1" and "2" have been used for the sake of simplicity in illustrating the example, the items represented by numerals "1" and "2" may be, for example, records in a relational database, XML documents, or any other item for which it is useful to store and retrieve the item using a computer system, such as computer system 106, in a database system, such as system 100.

At time i=3, an insertion transaction 108, i.e., insertion $+t_3$, may be made to dataset R. Since no deletions have yet occurred in the example, there are no "uncompensated deletions." Using method 300, every deletion from the dataset R may be eventually compensated by a subsequent insertion. At any given time, there are zero or more "uncompensated" deletions. The number of uncompensated deletions, "UD", at any time t may be defined recursively as a function of the number, n, of transactions 108 on the dataset R, processed up to time t, as follows:

Initially, for n=0, $UD(0)=0$;

$UD(n)=UD(n-1)+1$ if the $n$-th transaction is a deletion from $R$;

$UD(n)=\max[0, UD(n-1)-1]$ if the $n$-th transaction is an insertion into $R$.

The above definition may be loosely described in words as: the number of uncompensated deletions starts at zero; a new deletion adds to the number of uncompensated deletions; and a new insertion subtracts from the number of uncompensated deletions unless the number of uncompensated deletions is already zero.

In the case of an insertion, such as $+t_3$, with no uncompensated deletions, method 300 at step 306 may include the inserted item into the sample with probability M/|R|, where |R| is the size of the dataset R just after the insertion, and an included item replaces a randomly selected item in the sample, similar to reservoir sampling. As pointed out above, it is known in the art to reduce the computational costs of reservoir sampling by devising a method to directly generate the (random) number of arriving items to skip between consecutive sample inclusions, thereby avoiding the need to "flip a coin" (e.g., generate an include/exclude decision using a pseudo-random number generator) for each item.

In the present example, M=2, and |R| becomes 3 after the insertion of the item (represented by numeral "3") into dataset R so that item 3 may be inserted into sample S with probability 2/3, as shown by the three states 203a, 203b, and 203c. Thus, this step 306 of method 300 may have three possible outcomes, each equally likely, as indicated by the transition probabilities (1/3) shown at each of the transitions from state 202 to each of states 203a, 203b, and 203c. As a technicality, step 306 in FIG. 3 shows including the inserted item into sample S with probability M/max(M, |R|)—instead of M/|R|—where max(x, y) refers to the maximum of numbers x and y, to cover all cases including the special case in which there are no uncompensated deletions and the size |R| of the database has not yet exceeded M. (This may occur, for example, when insertion transactions are just starting to fill up the dataset R, and have only inserted a few items into R so that M/|R|>1, and hence can't be a probability. Once |R| exceeds M for the first time, then |R|>M whenever there are no uncompensated deletions, so that M/Max(M,|R|) equals M/|R|.)

At time i=4 and i=5, deletion transactions 108, i.e., $-t_2$ and $-t_3$, may be performed, removing items 2 and 3, respectively, from dataset R. The items 2 and 3 may be correspondingly removed from the sample S if they occur in the sample S. For example, at states 203a and 203b, item 2 is removed from sample S in response to deletion $-t_2$, but at state 203c, deletion $-t_2$ has no effect on the sample S.

Thus, at time i=5, there are two uncompensated deletions: an uncompensated deletion of item 2 associated with deletion $-t_2$, and an uncompensated deletion of item 3 associated with deletion $-t_3$. Method 300 may keep track of the number, $c_1$, of uncompensated deletions which have been in the sample S and the number, $c_2$, of uncompensated deletions which have not been in the sample S. For example, at state 205a, $c_1=1$ and $c_2=1$; while at state 205b, $c_1=2$ and $c_2=0$.

The transaction, $+t_4$, of item 4 may trigger the execution by method 300 of a pairing step 308. Insertion $+t_4$ may be paired with either deletion $-t_3$ (scenario A in FIG. 2) or deletion $-t_2$ (scenario B in FIG. 2) and each of these pairings may be equally likely. Thus, insertion $+t_4$ of item 4 may compensate its partner (item 3 in scenario A, item 2 in scenario B), and be included in the sample S if and only if the partner was in the sample prior to its deletion. Thus, for example, item 4 not being included at the left branch of state 205a corresponds to scenario A in which its partner item 3 was not in sample S, and item 4 being included at the right branch of state 205a corresponds to scenario B in which its partner item 2 was in sample S. The corresponding scenario (e.g., A or B) for each branch may be seen along the bottom of FIG. 2. For state 205a, as seen above, $c_1=1$ and $c_2=1$ so that $c_1/(c_1+c_2)=0.5$ and item 4 may be seen to have been included in one half of the branches from state 205a.

Thus, the pairing step 308 for transaction $+t_4$ amounts to including item 4 with probability $c_1/(c_1+c_2)$ and excluding item 4 with probability $c_2/(c_1+c_2)$, where the values of $c_1$ and $c_2$ depend on which path is taken through the tree of possibilities. For example, at state 205b, as seen above, $c_1=2$ and $c_2=0$ so that $c_1/(c_1+c_2)=1.0$ and item 4 may be seen to have been included in 100% of the branches from state 205b.

A pairing step 308 may also be executed for the insertion $+t_5$. At time i=7, there may be only one uncompensated deletion: either $-t_2$ in scenario A or $-t_3$ in scenario B. The results for inserting item 5 for each state under each of scenarios A and B are shown at time i=7 in FIG. 2. The probability of each resulting sample S, i.e., one of the states shown in FIG. 2, at any given time i may be computed by multiplying the probabilities along the path from the "root" at the top (state 202) to the node (e.g. state 207f) that represents the sample S. For example, the probability that sample S will arrive at state 207f may be calculated from FIG. 2 as 1/6 (or approximately 16% as indicated). At each time i, it can be seen in FIG. 2 that all samples of the same size produced by random pairing method 300 may be equally likely to occur, i.e., uniform sampling may be produced.

It can also be seen in FIG. 2 that it is not necessary to maintain the explicit identities of the uncompensated deletions. It may suffice to maintain a counter "$c_1$" of the number of uncompensated deletions which have been in the sample S and a counter "$c_2$" of the number of uncompensated deletions which have not been in the sample S, and add each included item to the sample with probability $c_1/(c_1+c_2)$ when $c_1+c_2>0$.

An alternative means of computing the ratio $c_1/(c_1+c_2)$ may also be provided without maintaining the two counters $c_1$ and $c_2$ so that method 300, for example, may only need to maintain a single counter (e.g., UD as defined above) rather than 2 counters ($c_1$ and $c_2$). The savings of keeping only one counter may be purchased at the cost of having to do some extra computations whenever the ratio $c_1/(c_1+c_2)$ may be needed—for example, at pairing step 308. For example, the single counter UD for uncompensated deletions may be maintained according to the recursive formula given above. The database size |R| and the sample size |S| being known at any point in time, $c_1$ and $c_2$ may be computed (e.g., by method 300) as:

$$c_1 = \min(M, |R|+UD) - |S|$$

$$c_2 = UD - c_1$$

It may be observed that the ratio $c_1/(c_1+c_2)$—used, for example, in method 300—is then equal to $[\min(M, |R|+UD) - |S|]/UD$.

FIG. 3 illustrates one exemplary implementation for random pairing method 300. The method 300 may provide a uniform random sample S of size bounded by M (a pre-determined positive integer) from a dataset R, which may be assumed to be a stable size dataset. As above, $c_1$ may be the number of uncompensated deletions which have been in the sample S and $c_2$ may be the number of uncompensated deletions which have not been in the sample S.

At step 302, method 300 may determine whether a transaction 108 to dataset R is an insertion or deletion. For an insertion, method 300 may continue at step 304. For a deletion, method 300 may continue at step 310.

At step 304, in the case of an insertion to dataset R, method 300 may determine whether there are any uncompensated deletions. For example, method 300 may keep count of uncompensated deletions, beginning the count at zero, incrementing the count for each deletion (e.g., steps 312, 314), and decrementing the count or stopping back at zero for each insertion (e.g., step 308). Method 300 may keep separate counts, $c_1$ for uncompensated deletions in the sample S and $c_2$ for uncompensated deletions not in the sample S, so that the total number of uncompensated deletions may be $c_1+c_2$. If there currently are no uncompensated deletions (e.g., $c_1+c_2=0$), no pairing of the current insertion to a deletion need be made so that method 300 may continue at step 306. If there currently are uncompensated deletions (e.g., $c_1+c_2>0$), method 300 may continue at pairing step 308.

At step 306, method 300 may perform an update 120 to the sample S. For example, method 300 may perform a process as described in FIG. 2 for the times i=2 or i=3. If |S|<M, and the item to be inserted in dataset R (referred to as "inserted item") is to be included in S, the inserted item can simply be added to S without exceeding the bound M. If |S|=M, and the inserted item is to be included in S, the inserted item may replace a random item of S in order for |S| not to exceed the bound M.

At step 308, method 300 may perform an update 120 to the sample S based on pairing the inserted item with some uncompensated deletion since $c_1+c_2>0$. For example, method 300 may perform a process as described for the times i=6 or i=7 as in FIG. 2. Determination of a random decision whether or not to include the inserted item into sample S with probability $c_1/(c_1+c_2)$ may be made, for example, using a pseudo-random number generator as known in the art.

If the transaction 108 is a deletion, method 300 may continue from step 302 to step 310. At steps 312 and 314, method 300 may perform a process as described for times i=4 and i=5 as in FIG. 2. If the item to be deleted from the dataset R (referred to as "deleted item") is included in S, method 300 may continue from step 310 to step 312. At step 312, the deleted item may be removed from S (e.g., via update 120) and the counter for uncompensated deletions for items in S, i.e., $c_1$, may be increased.

If the deleted item is not included in S, method 300 may continue from step 310 to step 314. At step 314, S need not be updated and the counter for uncompensated deletions for items not in S, i.e., $c_2$, may be increased.

Method 300 may then continue from any of steps 306, 308, 312, and 314, starting over at step 302, as each new transaction 108 in the stream of transactions 108 arrives (or may be generated) at computer system 106 to be processed.

Figure 4:
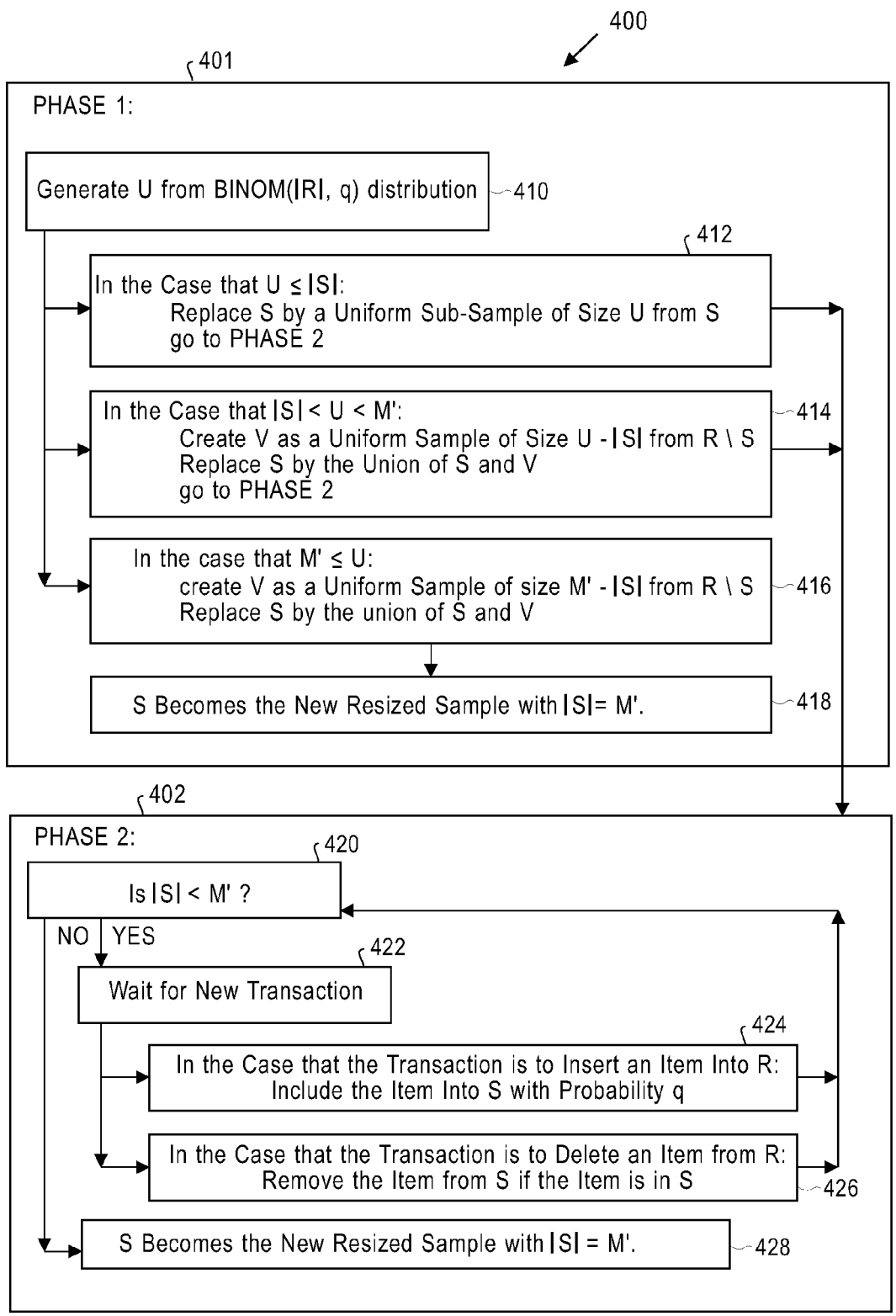
FIG. 4 is a flowchart illustrating another method of database sampling for sample resizing in accordance with an embodiment of the present invention.

FIG. 4 illustrates one exemplary implementation for a method 400 for resizing a sample S from a dataset R, which may, for example, be a growing size dataset. Because the dataset R may be growing in size, the bound M on the sample size |S| may desirably be periodically increased. The method 400 may—after starting with a uniform sample S of size at most M (e.g., a pre-determined positive integer) from a dataset R, and after some finite (possibly zero) number of arbitrary insertion and deletion transactions on R (e.g., stream of transactions 108)—produce a resized uniform sample of size M' from the resulting modified dataset R, where M<M'<|R|. The method 400 may perform such a sample resizing while minimizing a cost that may depend on some combination of the number of accesses (e.g., accesses 110) performed to the base dataset R and the number of transactions (e.g., transactions 108) performed on the base dataset R.

Method 400 may proceed by two phases, a first phase 401 (referred to as "phase 1") and a second phase 402 (referred to as "phase 2").

Method 400 may begin with phase 401 (phase 1)—which is briefly described here and then in more detail below. In phase 1, method 400 may convert the sample S to a BERN(q) sample, possibly accessing base dataset R in the process. The value of q may be chosen with regard to dataset R access cost and the time between successive transactions, e.g., chosen so as to reduce or minimize the expected time required by method 400 to resize the sample S, q being a real number in the interval between 0 and 1. Under certain circumstances, method 400 may terminate in phase 1, at step 418, returning the new, resized sample as output (e.g., S may become the resized sample) accessible, for example, to a human user via computer system 106. In general, method 400 continues from phase 1 to phase 2.

Method 400 may continue with phase 402 (phase 2)—which is briefly described here and then in more detail below—using Bernoulli sampling (with deletions allowed) from the stream of transactions 108 (and without access to the base dataset R) to increase the sample size |S| to the new upper bound value M'. In the general case, the sample S having been resized to increase the sample size (e.g., S may become the resized sample), bounded-size sampling, e.g., method 300, may be resumed on the resized sample, using the new upper bound M' in place of M.

Returning to the description of phase 1 in more detail, phase 1 may begin at step 410, by generating a random variable U having a BINOM(|R|, q) distribution. The random variable U may represent the initial Bernoulli sample size (i.e. initial size for the new resized sample to be constructed). The value of random variable U may be, for example, either less than |S|, between |S| and M', or greater than M' (but less than or equal to |R| since chosen from a BINOM(|R|, q) distribution). The random variable U may be generated by computer system 106, for example, using a pseudo-random number generator as known in the art.

Depending on the value of U, method 400 may continue at one of steps 412, 414, or 416 as shown in FIG. 4. The result of steps 412, 414, and 416, taken together, is that method 400 may use as many items from S as possible to make up the initial Bernoulli sample having size U, while accessing base dataset R only if U>|S|.

More specifically, at step 412, U≦|S| and computer system 106 may perform step 412 with no accesses 110 of base dataset R. The initial Bernoulli sample may be created at step 412 by taking any uniform random sample of size U from S. For example, the reservoir sampling algorithm (with reservoir size equal to U) may be run on S, or the elements of S may be randomly permuted and then the first U elements chosen. Method 400 may then continue at phase 2 in order to add the remaining (M'-U) items to the initial Bernoulli sample to create the new resized sample of size M'.

At step 414, |S|<U<M' and computer system 106 may perform step 414 with (U-|S|) or more accesses 110 of base dataset R to add (U-|S|) items of a uniform sample V to the sample S to form the initial Bernoulli sample of size U. Because the sample S is to be increased, the items of V may be taken from those items of the dataset R that are not already in S (denoted as R\S). In addition, each new sample item may be checked to ensure that it is not already in V. Thus, the items of V added to S may be added without repetition (i.e., forming the union of S and V) to form the initial Bernoulli sample of size U. Method 400 may then continue at phase 2 in order to add the remaining (M'-U) items to the initial Bernoulli sample to create the new resized sample of size M'.

At step 416, U≧M' and computer system 106 may perform step 416 with (M'-|S|) or more accesses 110 of base dataset R to add (M'-|S|) items of a uniform sample V to the sample S to form the initial Bernoulli sample of size M'. (Because U≧M', only (M'-|S|) out of (U-|S|) items may be needed. In other words, method 400 may terminate at step 418, in effect having taken an immediate sub-sample of size M' from a Bernoulli sample of size U.) Because the sample S is to be increased, the items of V may be taken from R\S. In addition, each new sample item may be checked to ensure that it is not already in V. Thus, the items of V may be added to S without repetition, and the union of S and V may form the initial Bernoulli sample of size M'. Alternatively, the entire initial Bernoulli sample of size M' could be sampled from R, that is, sampled "from scratch". For either method of producing the initial Bernoulli sample, this initial sample may be used as the new resized sample with size M' so that method 400 may terminate at step 418, returning the new, resized sample as output (e.g., S may become the resized sample with |S|=M') accessible, for example, to a human user or other processes operating in computer system 106.

Returning to the description of phase 2 in more detail, phase 2 may begin at step 420 with a determination whether the sample S in the process of being resized has yet grown to the desired size M' from the initial Bernoulli sample that may have been passed to phase 2 from either of steps 412 or 414 of phase 1. For example, phase 2 may begin at step 420 with sample S becoming the initial Bernoulli sample of size |S|=U and after each iteration of steps 422, 424, and 426 may modify sample S, step 420 may check, for example, whether |S|=M'.

If the desired size M' for sample S has been reached, method 400 may continue at step 428. The new, resized sample may have size M' (S remains bounded by M') so that method 400 may terminate at step 428, returning the new, resized sample as output (e.g., S may become the resized sample with |S|=M') accessible, for example, to a human user or other processes operating in computer system 106.

If the desired size M' has not been reached, i.e., |S|<M', method 400, at steps 422, 424, and 426, may increase the size of sample S (while S remains bounded by M' since |S|<M') by sampling from the stream of transactions 108 using Bernoulli sampling with the same parameter q used in phase 1 so that S remains uniform. More specifically, at step 422, method 400 may wait for a new transaction from the stream of transactions 108. In other words, method 400 may have access to each of the transactions 108 as they are processed by computer system 106, and method 400 may perform its own processing (e.g., via computer system 106) on each transaction 108 as each transaction 108 may be generated.

Depending on whether the transaction 108 is an insertion or a deletion, method 400 may continue at one of steps 424 or 426 as shown in FIG. 4. At step 424, the item inserted into dataset R may be included in the sample S with probability q. For example, a pseudo-random number generator could be used to generate an include decision with probability q and an exclude decision with probability 1-q, as known in the art. The size |S| of S after modification by step 424 may be determined. For example, if the inserted item has been included in S then the size |S| may be incremented; otherwise, if the inserted item has not been included, the size |S| may remain the same.

At step 426, the item deleted from dataset R may be removed from the sample S if present in S. The size |S| of S after modification by step 426 may be determined. For example, if the deleted item has been previously included in S (and so may be removed from S) then the size |S| may be decremented; otherwise, if the deleted item has not been previously included (may not be removed), the size |S| may remain the same.

As shown in FIG. 4, steps 420, 422, 424, and 426 may be repeated until the sample S grows to the desired size M', at which method 400 may terminate at step 428 as described above.

The value chosen for parameter q may have an effect on the cost of executing method 400 in terms of execution time depending, for example, on the time required for database accesses 110 and time required to perform transactions 108. For example, define $t_a$ as the amount of time used by computer system 106 for each base dataset R access 110. Also, define $t_b$ as the average time between successive insertion/deletion transactions 108 in computer system 106, which may be assumed to be essentially constant. Assuming that, as would be usual in practice, the sample size |S| is equal to M just prior to resizing, the expected (average) time to execute phase 1 of method 400 may be calculated approximately as: $T_1(q) = t_a|R|\ln[(|R|-M)/(|R|-M-N(|R|q))]$ where N may be the size of the sample V in phase 1. The expected time to execute phase 2 of method 400 may be calculated approximately as: $T_2(q)=t_b(M'-|R|q)^+/q$ where $x^+=\max(x, 0)$. The foregoing estimate $T_2(q)$ may assume that insertions are the only transactions 108 performed on the dataset. In the more general case with insertions and deletions, a value p may be chosen so that with probability p>1/2 the transaction 108 may be an insertion and with probability (1-p) the transaction 108 may be a deletion. The parameter p may be estimated, for example, from observations of the stream of transactions 108. It may be observed that roughly 1/(2p-1) times as many steps may be required, on average, to finish phase 2 in the presence of deletions. The estimate $T_2(q)$ may be refined to take deletions into account, for example, as: $T_2(q)=t_b(M'-|R|q)^+/(q(2p-1))$. The total expected time to resize a sample using method 400 may be evaluated as approximately $T(q)=T_1(q)+T_2(q)$.

A value q* may be chosen for q so as to minimize the value of T(q) as follows. A value $q_0$ may be computed in the interval of real numbers from M/|R| to M'/|R| such that the first derivative of T(q) evaluated at $q_0$ may be zero, i.e., $T'(q_0)=0$. For example, when all transactions are insertions, $q_0$ may computed as $q_0=((1+4\theta)^{1/2}-1)/2\theta$ where $\theta=(t_a/t_b)(|R|/M')$. Then q* may be chosen according to which of the quantities $T(q_0)$, $T(M/|R|)$, or $T(M'/|R|)$ is the smallest.

In summary, when accesses to R are very expensive, the resizing method 400 may optimize q relative to phase 1 and phase 2 by setting q=M/|R| and create the initial Bernoulli sample as approximately the same as the current sample S, thereby avoiding base-data accesses 110 to R and shifting the sampling work to phase 2. That is, the algorithm essentially reduces to Bernoulli sampling (with deletions allowed). The total resizing cost for dataset sizes for which method 400 sets q=M/|R| may be approximately $t_b((M'/M)-1)|R|$.

When accesses to |R| are very inexpensive, the resizing method 400 may optimize q by setting q.=M'/|R| and may, for example, immediately resize the sample by filling up S with items drawn randomly from R\S, in which case the total cost for resizing may be approximately $t_a(M'-M)$.

For cases intermediate between the foregoing extremes, resizing method 400 may optimize q by setting $q=q_0$ as above and thereby split the sampling work between phases 1 and 2, thereby exhibiting behavior intermediate between immediate resizing and Bernoulli sampling. The foregoing example presents one possibility for optimizing q. Numerous other possibilities for optimizing q may exist, however, such as optimizing q using Monte Carlo methods, or stochastic optimization techniques.

Figure 5:
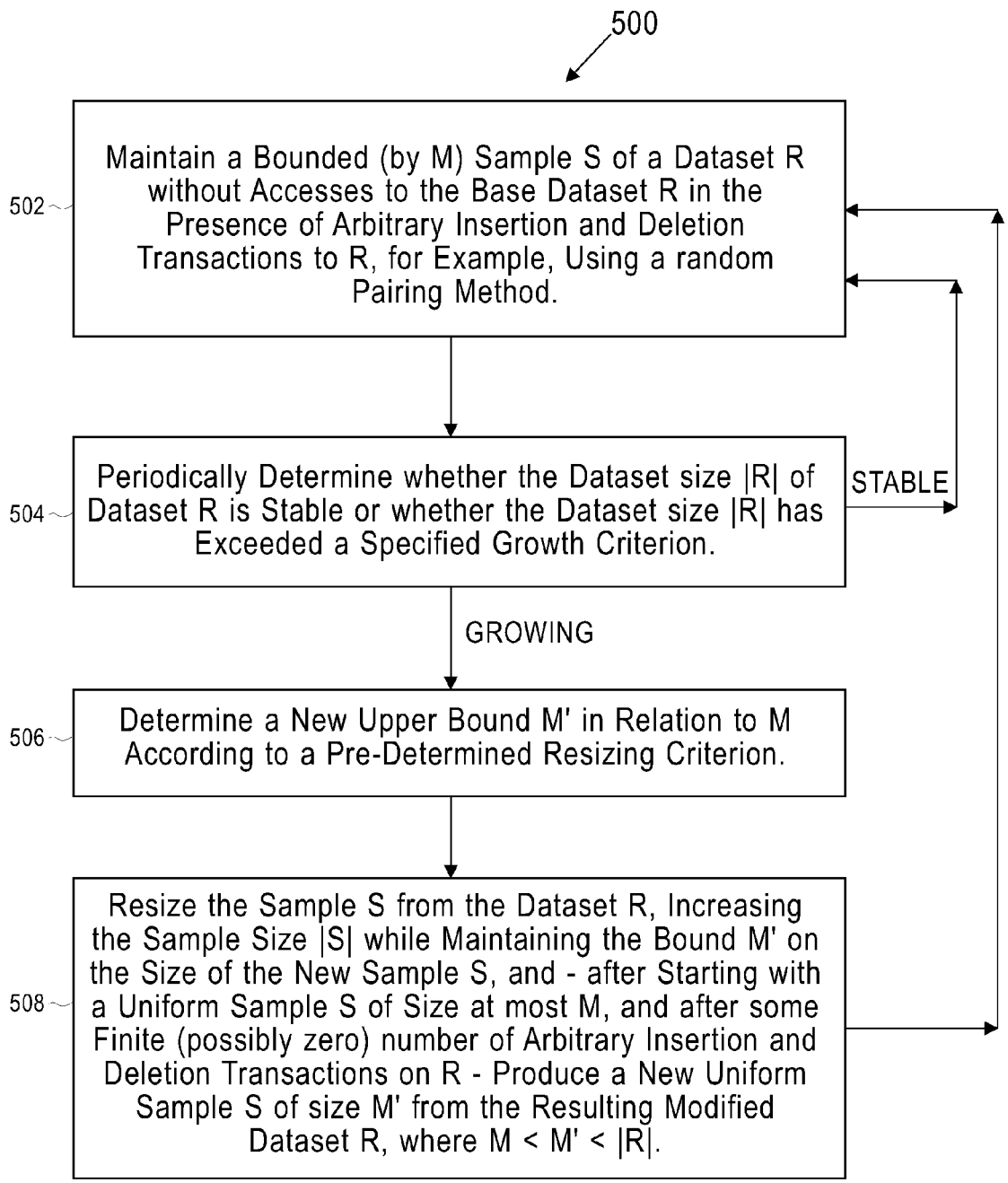
FIG. 5 is a flowchart illustrating yet another method of database sampling in accordance with an embodiment of the present invention.

FIG. 5 illustrates a method 500 of database sampling in accordance with one embodiment of the present invention. Method 500 may combine a random pairing method 300 with a Bernoulli resizing method 400 to provide uniform sampling while maintaining an upper bound M on the sample, yet periodically resizing the sample S (to have a new bound M'>M) to maintain the sample size |S| so that the sample size |S| does not become an increasingly smaller fraction of the base dataset size |R| in the presence of growth of the base dataset R. After resizing, the new bound M' may become the stable bound M for random pairing using method 300 until the next resizing may be needed. Method 500 may be executed, for example, on a computer system 106, and computer system 106 may make the resulting sample S available to other methods either executing on computer system 106 or communicating with computer system 106. Computer system 106 may also make the information in sample S accessible, for example, to a human user via, for example, a display with graphical user interface.

More specifically, method 500 may begin at step 502 by maintaining a sample S of stable size bounded by a pre-determined integer M, using, for example, some embodiment of method 300 applied to the dataset R.

Method 500 may continue at step 504 by periodically monitoring the size |R| of dataset R and applying any chosen growth criterion to determine whether to resize S. For example, it may be decided to resize S if the sampling fraction, e.g., |S|/|R|, becomes less than some specified amount, for example, 9%. In symbols, the growth criterion may be "resize S if |S|/|R|<k." In the particular example given, k=9%. Also, for example, a growth criterion may be specified by comparing the current size |R| to some previous size $|R_0|$ of dataset R. So, for example, it may be decided to resize S if |R| exceeds $|R_0|$ by 10%, or |R| has doubled in size compared to $|R_0|$, and so forth. Also, for example, it may be decided to resize S if |R| exceeds $|R_0|$ by some given number—say 10,000—of data items included in the dataset R. Any particular growth criterion may be used, and the growth criterion may be static or dynamically changing. The growth criterion need not explicitly be computed from the values of |R| and $|R_0|$ as in the foregoing examples. For example, it may be decided to resize S periodically with some particular frequency (e.g., every 5 minutes or every 24 hours) given, for example, a knowledge that the size |R| of dataset R is generally increasing.

If at step 504 method 500 determines that the size |R| is stable, e.g., the growth criterion yields a decision not to resize S, method 500 may continue, as shown, at step 502. If at step 504 method 500 determines that the size |R| is growing, e.g., the growth criterion yields a decision to resize S, method 500 may continue, as shown, at step 506.

At step 506, a new upper bound M' may be determined according to any chosen resizing criterion. For example, it may be chosen to resize the sample S by 30% if the sampling fraction |S|/|R| becomes less than 9%. Thus, in this example, the resizing criterion may be expressed in symbols as "M'=1.3M." Any particular resizing criterion may be used, and the resizing criterion may be static or may change dynamically as method 500 executes.

Method 500 may continue at step 508 from step 506 by resizing the sample S while maintaining the new bound M' using, for example, an embodiment of method 400 applied to the dataset R and sample S. After resizing step 506, method 500 may continue, for example, random pairing sampling method 300, at step 502 using the new bound M' as the bound M.

Figure 6:
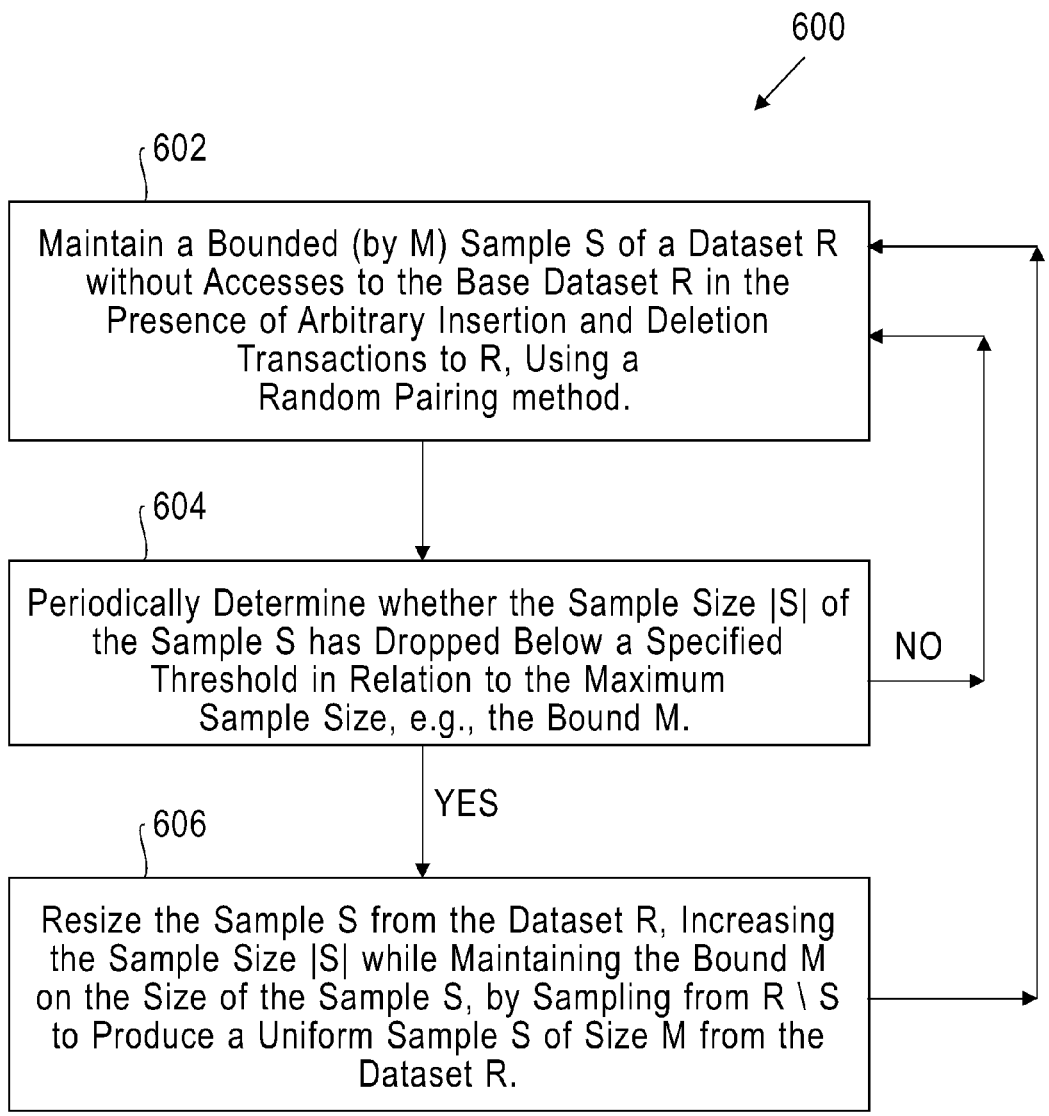
FIG. 6 is a flowchart illustrating still another method of database sampling in accordance with an embodiment of the present invention.

FIG. 6 illustrates a method 600 of database sampling in accordance with one embodiment of the present invention. Method 600 may provide an alternative embodiment of the random pairing method 300 that is suited to a situation in which the size |R| of the dataset R is stable in the long run, but experiences relatively large short-term fluctuations (e.g., many insertions, followed by many deletions, followed by many insertions, and so on, or any combination of transactions leading to relatively large short-term fluctuations). Thus, method 600 may perform a random pairing method 300 to provide uniform sampling while maintaining an upper bound M on the sample, yet periodically refill the sample S to maintain the sample size |S| so that the sample size |S| does not fluctuate widely relative to either the base dataset size |R| or the maximum sample size, e.g., the upper bound M. Method 600 may be executed, for example, on a computer system 106, and computer system 106 may make the resulting sample S available to other methods either executing on computer system 106 or communicating with computer system 106. Computer system 106 may also make the information in sample S accessible, for example, to a human user via, for example, a display with graphical user interface.

More specifically, method 600 may begin at step 602 by maintaining a sample S bounded by a pre-determined integer M, using, for example, some embodiment of method 300 applied to the dataset R.

At step 604, method 600 may check to determine whether the sample size |S| has decreased by some pre-determined criterion for which it may be desirable to re-increase the sample size |S| to be closer to the upper bound M. For example, a threshold may be specified as any fraction, between 0 and 1, of M, e.g., a threshold of 80% of M, and the pre-determined criterion may be whether the sample size |S| has fallen below the threshold, e.g., whether |S|<0.8 M. Such a decrease in sample size could occur, for example, as a result of the number of uncompensated deletions for which an item is removed from the sample S growing to over 20% of the sample size |S|. If the criterion is not satisfied, e.g., |S| is not less than 0.8 M, method 600 may return to step 602 and continue to execute random pairing (method 300) while periodically checking the criterion at step 604. If the criterion is satisfied, e.g., |S|<0.8 M, method 600 may continue at step 606. Other criteria could also be used. For example, a criterion could be related to the quality of (statistical) estimates derived from the sample S. For example, the sample S could be resized only if the dataset R is growing and the quality of estimates is insufficient according to some pre-determined standard of quality of the estimates desired.

At step 606, method 600 may fill up (e.g., increase the sample size so that |S|=M) the sample S. For example, method 600 may use base dataset accesses to sample from R\S using, for example, reservoir sampling to re-increase the size |S| of the sample S. While the upper bound M has been used in this example to illustrate a value for specifying a threshold and for refilling the sample S, the maximum sample size previously reached or some other suitable value for specifying the threshold and desirable sample size could be used. Method 600 may return to step 602 and continue to execute random pairing (method 300) after execution of step 606.

As may be apparent to one of ordinary skill in the art to reduce the computational costs of any of methods 400, 500, or 600 by using a known method to directly generate the (random) number of arriving items to skip between consecutive sample inclusions, thereby avoiding the need to "flip a coin" (e.g., generate an include/exclude decision using a pseudo-random number generator) for each item.

It should be understood, of course, that the foregoing relates to exemplary embodiments of the invention and that modifications may be made without departing from the spirit and scope of the invention as set forth in the following claims.

We claim:

1. A method of incrementally maintaining a stable, bounded, uniform random sample S from a dataset R, in the presence of arbitrary insertions and deletions of an item t to the dataset R, and without accesses to the dataset R, the sample S having a maximum size of M items, the method comprising the steps of:

initializing to zero a counter $c_1$ for uncompensated deletions that have been applied to sample S;

initializing to zero a counter $c_2$ for uncompensated deletions that have not been applied to sample S;

while transactions comprising insertions and deletions are applied to dataset R, each transaction having a transaction type selected from a group consisting of an insertion transaction and a deletion transaction, performing steps A through C:

A. receiving a transaction applied to dataset R for an item t;

B. if the received transaction is an insertion transaction, then if the total number $c_1+c_2$ of uncompensated deletions is zero, then performing the steps of including the item t into the sample S with probability equal to the value of M divided by the maximum of size |R| and M, wherein |R| is the size of the dataset R just after insertion of item t, adding item t to sample S if |S|<M, and replacing a randomly selected item in sample S by item t if |S|>=M, otherwise if the total number $c_1+c_2$ of uncompensated deletions is non-zero, then performing the steps of inserting item t into the sample S with probability equal to the value of c1/(c1+c2), decrementing by 1 the value of counter $c_1$ if the item t is inserted into sample S, and decrementing by 1 the value of counter $c_2$ if the item t is not inserted into sample S; and C. if the received transaction is a deletion transaction, then if the deleted item t is in the sample S, then performing the steps of removing the deleted item t from S and increasing the value of the counter $c_1$ by one, otherwise, performing the step of increasing the value of the counter $c_2$ by one.

\* \* \* \* \*